United States Patent
Miller et al.

(10) Patent No.: US 9,419,846 B2
(45) Date of Patent: Aug. 16, 2016

(54) INTEGRATED WIRELESS MODULE

(71) Applicant: Honeywell International Inc., Morristown, NJ (US)

(72) Inventors: David Lowell Miller, Kirkland, WA (US); Sandra J. Howe-Ryberg, Renton, WA (US); Sharon C. Eaglestone, Monroe, WA (US); David B. Goldstein, Washington, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 121 days.

(21) Appl. No.: 14/147,259

(22) Filed: Jan. 3, 2014

(65) Prior Publication Data

US 2015/0195120 A1   Jul. 9, 2015

(51) Int. Cl.

| H04B 1/38 | (2015.01) |
|---|---|
| H04L 29/06 | (2006.01) |
| H04W 88/10 | (2009.01) |
| H04L 27/12 | (2006.01) |
| H04L 29/08 | (2006.01) |
| H04W 84/00 | (2009.01) |

(52) U.S. Cl.
CPC .......... *H04L 29/06163* (2013.01); *H04L 27/12* (2013.01); *H04L 67/12* (2013.01); *H04W 88/10* (2013.01); *H04W 84/005* (2013.01)

(58) Field of Classification Search
CPC .............................. H04B 1/38; H04L 12/2898
USPC .................................................. 375/222, 219
See application file for complete search history.

(56) References Cited

U.S. PATENT DOCUMENTS

| 5,883,586 A | 3/1999 | Tran et al. |
| 5,992,290 A | 11/1999 | Quebedeaux et al. |

(Continued)

FOREIGN PATENT DOCUMENTS

| CN | 1426025 | 6/2003 |
| CN | 201312333 | 9/2009 |

(Continued)

OTHER PUBLICATIONS

European Patent Office, "Extended European Search Report from EP Application No. 14198390.8 mailed May 15, 2015", "From Foreign Counterpart of U.S. Appl. No. 14/147,259", May 15, 2015, pp. 1-10, Published in: EP.

(Continued)

*Primary Examiner* — Helene Tayong
(74) *Attorney, Agent, or Firm* — Fogg & Powers LLC (57) ABSTRACT

A subassembly for an integrated wireless module is provided. The subassembly includes an integrated-wireless-module input/output (I/O) connector, a modem controller; at least one internal antenna, and at least two modem connectors communicatively coupled to the modem controller, the modem connectors configured to interface with at least two modems. The modem controller digitally selects to one of: communicatively couple one of the at least two modem connectors to one of the at least one internal antenna; communicatively couple one of the at least two modem connectors to the integrated-wireless-module I/O connector; and communicatively couple a first one of the at least two modem connectors to one of the at least one internal antenna and communicatively couple a second one of the at least two modem connectors to the integrated-wireless-module I/O connector.

19 Claims, 8 Drawing Sheets

(56) References Cited

U.S. PATENT DOCUMENTS

| | | |
|---|---|---|
| 6,072,994 A | 6/2000 | Phillips et al. |
| 6,167,238 A | 12/2000 | Wright |
| 6,477,359 B2 | 11/2002 | Heppe et al. |
| 7,016,674 B2 | 3/2006 | Jones et al. |
| 7,103,456 B2 | 9/2006 | Bloch et al. |
| 7,136,643 B2 | 11/2006 | Campbell |
| 7,260,376 B2 | 8/2007 | Hogyoku |
| 7,263,335 B2 | 8/2007 | Leabman |
| 7,319,715 B1 | 1/2008 | Souissi et al. |
| 7,349,669 B2 | 3/2008 | Toyama |
| 7,353,090 B2 | 4/2008 | Leonard et al. |
| 7,356,389 B2 | 4/2008 | Holst et al. |
| 7,460,839 B2 | 12/2008 | Leabman |
| 7,489,992 B2 | 2/2009 | Valette et al. |
| 7,548,533 B2 | 6/2009 | Reitmann et al. |
| 7,620,374 B2 | 11/2009 | Ziarno et al. |
| 7,765,356 B2 | 7/2010 | Weber |
| 7,869,385 B2 | 1/2011 | Leonard et al. |
| 8,019,338 B2 | 9/2011 | Malaga et al. |
| 8,022,843 B2 | 9/2011 | Mitchell et al. |
| 8,081,933 B2 | 12/2011 | Malaga et al. |
| 8,260,971 B2 * | 9/2012 | Fa et al. .............................. 710/2 |
| 8,301,196 B2 | 10/2012 | Kauffman et al. |
| 8,326,359 B2 | 12/2012 | Kauffman |
| 8,345,704 B2 | 1/2013 | Desai et al. |
| 2002/0004411 A1 | 1/2002 | Heppe et al. |
| 2003/0161131 A1* | 8/2003 | Jones .................. H05K 7/1422 |
| | | 361/796 |
| 2005/0107136 A1 | 5/2005 | Lim et al. |
| 2005/0228559 A1* | 10/2005 | Bloch et al. ..................... 701/33 |
| 2006/0012531 A1 | 1/2006 | Kinney et al. |
| 2007/0243505 A1* | 10/2007 | Rath et al. ....................... 434/29 |
| 2009/0017777 A1 | 1/2009 | Malaga et al. |
| 2010/0189089 A1 | 7/2010 | Lynch et al. |
| 2010/0302958 A1 | 12/2010 | Wietfeldt et al. |

FOREIGN PATENT DOCUMENTS

| | | |
|---|---|---|
| EP | 1648098 | 10/2005 |
| EP | 2015473 | 7/2008 |
| EP | 2129006 | 5/2009 |
| EP | 2416500 | 8/2012 |
| EP | 2518977 | 10/2012 |

OTHER PUBLICATIONS

Bahl et al., "Reconsidering Wireless Systems with Multiple Radios", "ACM SIGCOMM Computer Communications Review", Oct. 2004, pp. 39-46, vol. 34, No. 5.

* cited by examiner

INTEGRATED WIRELESS MODULE

BACKGROUND

Wireless technology is in an advancement cycle which far exceeds the lifecycle of the products that rely on it. Within the lifecycle of an avionics device, cellular technology is poised to transform from 3G to 4G to Long Term Evolution (LTE) and potentially beyond. WiFi technology is also advancing and the standards are expected to move from 802.11n to 802.11ac. Currently, as the technology advances wireless devices are completely replaced. Changing out devices is expensive and the replacement of devices within avionics systems is time consuming.

SUMMARY

The present application relates to a subassembly for an integrated wireless module. The subassembly includes an integrated-wireless-module input/output (I/O) connector, a modem controller; at least one internal antenna, and at least two modem connectors communicatively coupled to the modem controller, the modem connectors configured to interface with at least two modems. The modem controller digitally selects to one of: communicatively couple one of the at least two modem connectors to one of the at least one internal antenna; communicatively couple one of the at least two modem connectors to the integrated-wireless-module I/O connector; and communicatively couple a first one of the at least two modem connectors to one of the at least one internal antenna and communicatively couple a second one of the at least two modem connectors to the integrated-wireless-module I/O connector.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below overcome the difficulties in keeping up with wireless technology advances described above by providing a way to upgrade the wireless technologies within a device without replacing the device itself. In addition, embodiments described below advantageously support multiple communication options within a single avionics device to significantly extend the use and the reliability of the communications by providing secondary or tertiary communication pathways in the event that a service for a primary pathway is not available.

The technology described herein supports multiple communications modems (radios) within a single subassembly. The subassembly provides all of the necessary mounting, power, and processing to operate the various communications modems. To support the speed with which the technology refreshes, the subassembly is designed to be field replaceable. The subassembly includes driver software for the various radios contained therein.

Figure 1A:
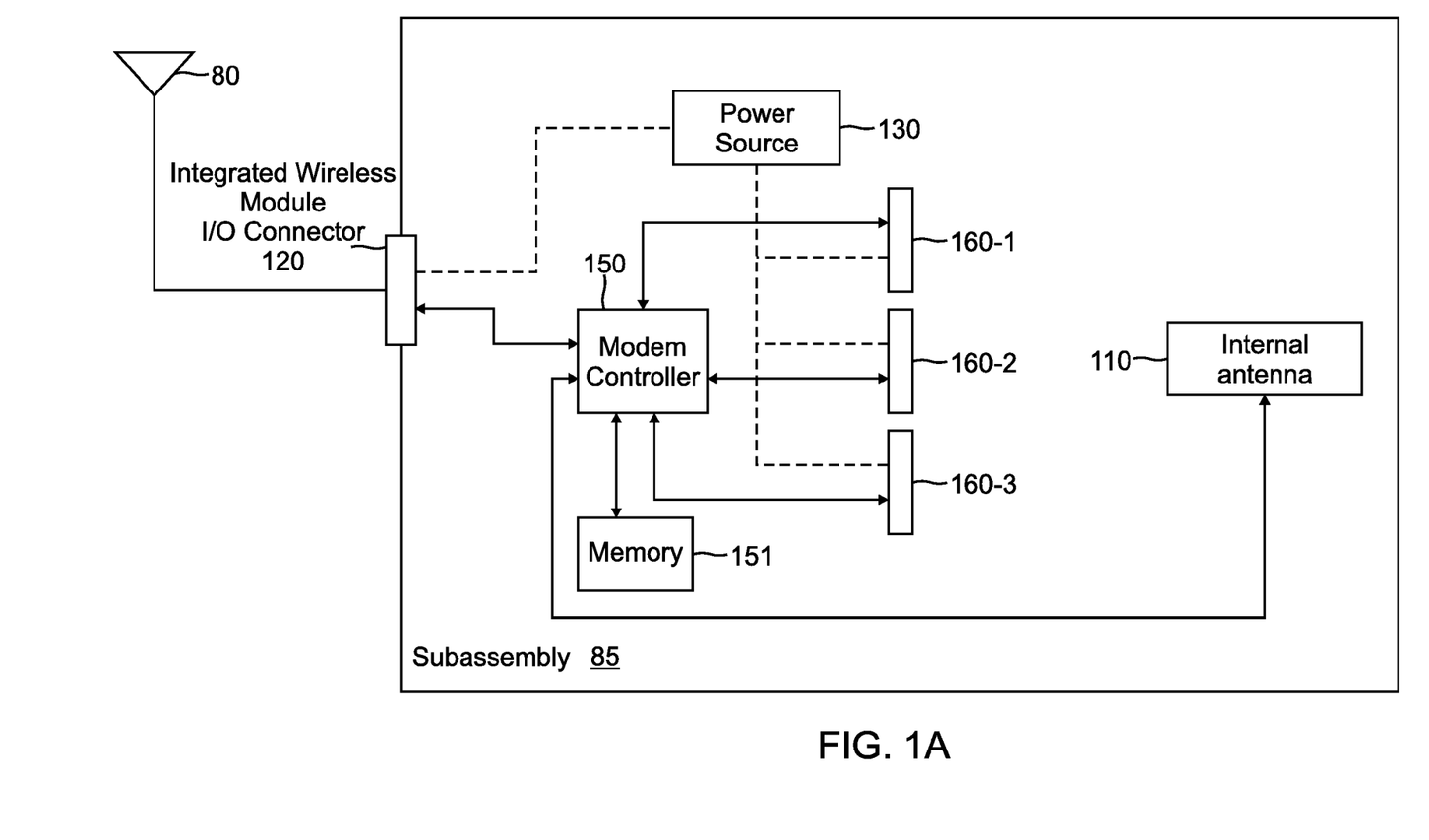
FIG. 1A is an embodiment of a subassembly in accordance with the present application.

FIG. 1A is an embodiment of a subassembly 85 in accordance with the present application. The subassembly 85 includes an integrated-wireless-module input/output (I/O) connector 120, a modem controller 150, at least one internal antenna 110, and at least two modem connectors 160(1-3) communicatively coupled to the modem controller 150. The at least two modem connectors 160(1-3) are containment structures (e.g., slots) configured to interface with at least two modems (not shown in FIG. 1). The terms "modem" and "radio" are used interchangeably herein. The subassembly 85 also includes a power source 130 and a memory 151. The power source 130 provides power to any radios that are inserted in the modem connectors 160(1-3). The power source 130 is configured to input power from a power supply via the integrated-wireless-module I/O connector 120 and to provide power as required to any modem inserted into the modem connectors 160(1-3). The integrated-wireless-module I/O connector 120 is communicatively coupled to an external antenna 80. The modem controller 150 is communicatively coupled to the internal antenna 110.

In one implementation of this embodiment, the external antenna is external to an aircraft. In another implementation of this embodiment, the external antenna on an aircraft includes at least a portion of the skin of the aircraft. In yet another implementation of this embodiment, the at least one internal antenna 110 is built into the subassembly 85. In yet another implementation of this embodiment, the at least one internal antenna is at least two internal antennas on the subassembly 85. In yet another implementation of this embodiment, the at least one internal antenna is at least two internal antennas on the subassembly 85 that are communicatively coupled to a 4G cellular modem configured to make use of interference to improve reception. In yet another implementation of this embodiment, the integrated-wireless-module I/O connector 120 is communicatively coupled to a plurality of external antennas 80. In yet another implementation of this embodiment, a plurality of integrated-wireless-module I/O connectors 120 is communicatively coupled to a respective plurality of external antennas 80.

Figure 1B:
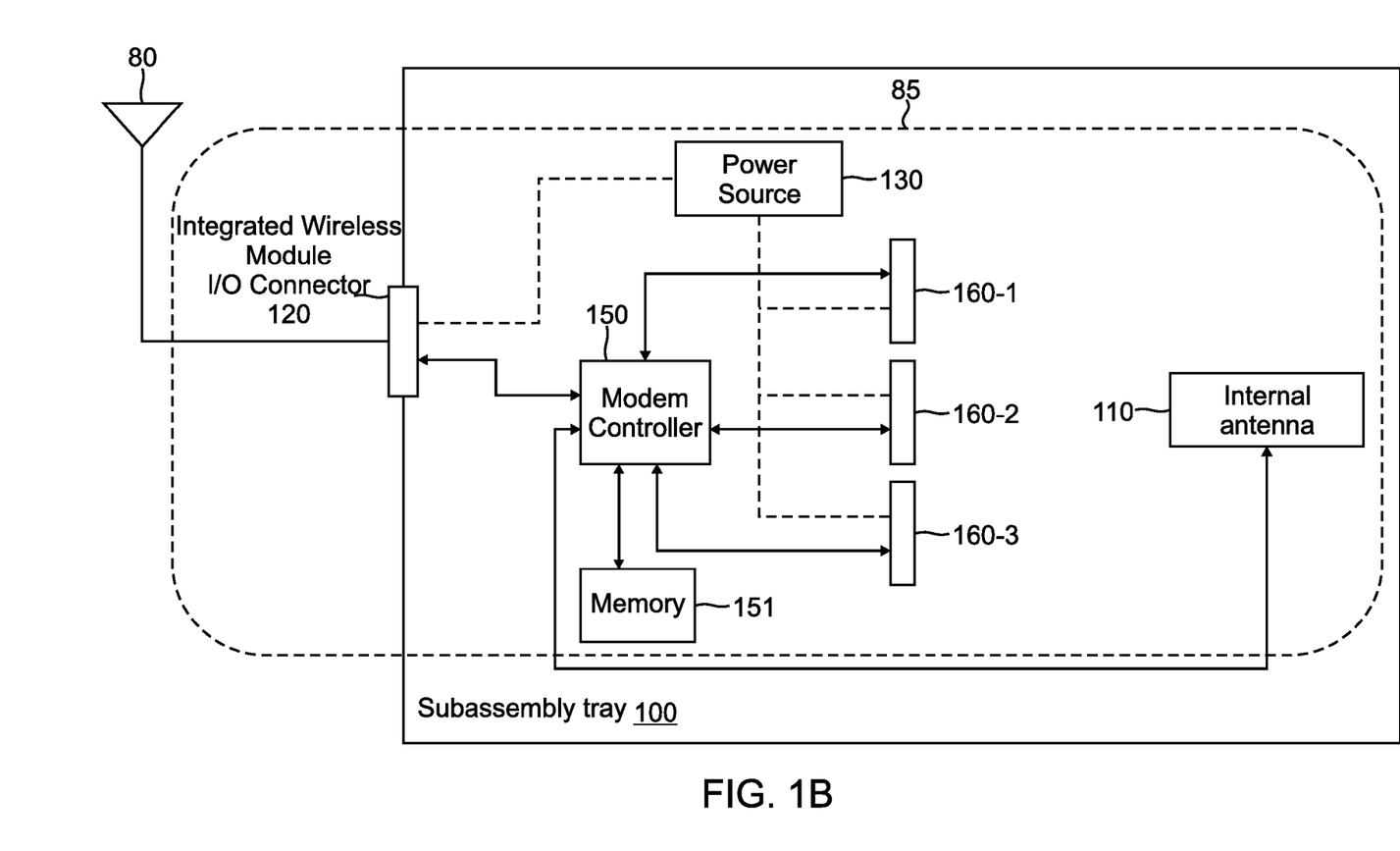
FIG. 1B is an embodiment of a subassembly on a subassembly tray in accordance with the present application.

The technology described herein also provides at least one separately packaged, slide-in wireless tray, which is referred to herein as a subassembly tray, configured to support the subassembly. FIG. 1B is an embodiment of a subassembly 85 on a subassembly tray 100 in accordance with the present application. In this embodiment, the subassembly 85 is supported by the subassembly tray 100. Specifically, the subassembly 85 is built into or is attached to the subassembly tray 100. The subassembly 85 is designed for use in an integrated wireless module. The subassembly 85 supported on the subassembly tray 100 is similar in structure and function to the subassembly 85 of FIG. 1A.

In one implementation of this embodiment, the subassembly tray 100 is a printed circuit board (PCB) with an edge connector that forms the integrated-wireless-module I/O connector 120. In another implementation of this embodiment, the subassembly tray 100 is a metal tray with the various components of the subassembly 85 attached to it.

Figure 2:
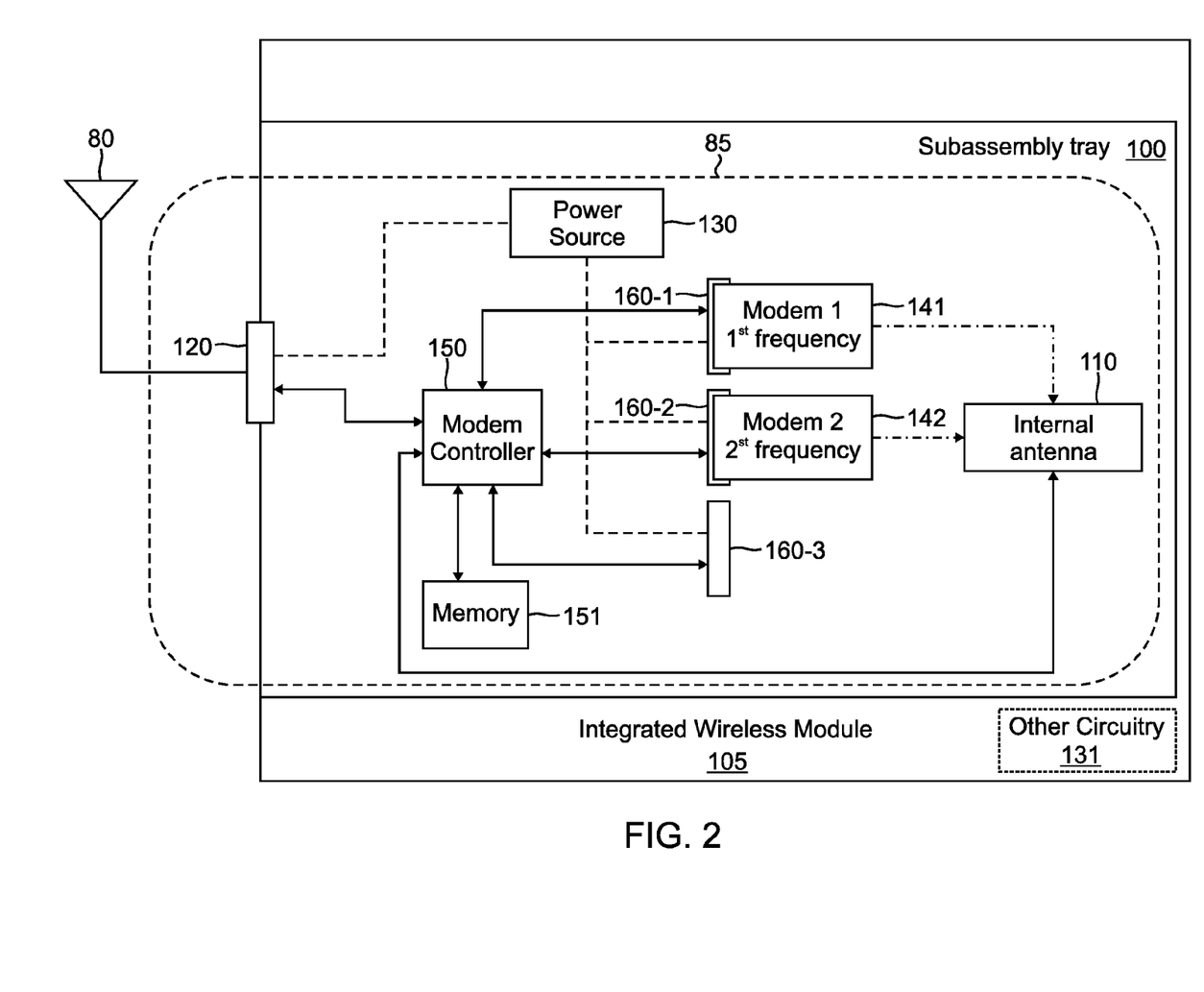
FIG. 2 is an embodiment of an integrated wireless module in accordance with the present application.

FIG. 2 is an embodiment of an integrated wireless module 105 in accordance with the present application. In one implementation of this embodiment, the integrated wireless module 105 is a line replacement unit (LRU). As shown in FIG. 2, the integrated wireless module 105 includes the subassembly 85 on the subassembly tray 100 of FIG. 1 with a first modem 141 inserted in the first modem connector 160-1 and a second modem 142 inserted in the second modem connector 160-1. The integrated wireless module 105 includes at least one integrated-wireless-module I/O connector 120. The first and second modems 141 and 142 are any type of cellular technology or any future wireless technology. For example, each of the first and second modems 141 and 142 can be implemented in accordance with one of the following technologies: 3G, 4G, long term evolution (LTE), general packet radio service (GPRS), code division multiple access (CDMA), WiFi, WiMAX, or satellite. A local processor supports the relevant drivers for the radios included. Power for the first and second modems 141 and 142 is obtained from the host system (e.g., a host avionics/vetronics or a wireless system) that is communicatively coupled to the subassembly tray 100 via integrated-wireless-module I/O connector 120.

The modem controller 150 is communicatively coupled to the first and second modems 141 and 142.

In one implementation of this embodiment, the subassembly tray 100 slides into the integrated wireless module 105 to share a common integrated-wireless-module I/O connector 120. In another implementation of this embodiment, the subassembly tray 100 is a first PCB on a second PCB that is the integrated wireless module 105.

As shown in FIG. 2, the integrated wireless module 105 optionally includes other circuitry 131 for other functions. In one implementation of this embodiment, the other circuitry 131 has other functionality on the integrated wireless module 105 and is communicatively coupled to the wireless system or avionics system via the integrated-wireless-module I/O connector 120 that is shared with the subassembly tray 100. In another implementation of this embodiment, the other circuitry 131 that has other functionality on the integrated wireless module 105 is communicatively coupled to the wireless system or avionics system via a different integrated-wireless-module I/O connector (not shown).

As shown in FIG. 2, the first modem 141 is operational at a first frequency or frequency range and the second modem 142 is operational at a second frequency or frequency range. In one implementation of this embodiment, the second frequency range is offset from the first frequency range. In another implementation of this embodiment, the second frequency range at least partially overlaps with the first frequency range. In yet another implementation of this embodiment, the first modem is functional with a first wireless service and the second modem is functional with a second wireless service.

The modem controller 150 digitally selects to one of: communicatively couple one of the first and second modems 141 and 142 to one of the at least one internal antenna 110; communicatively couple one of the first and second modems 141 and 142 to at least one external antenna (not shown in FIG. 1) via the integrated-wireless-module I/O connector 120; and communicatively couple a first one of the first and second modems 141 and 142 to one of the at least one internal antenna 110 and communicatively couple a second one of the first and second modems 141 and 142 to one of the at least one external antenna via the integrated-wireless-module I/O connector 120.

In one implementation of this embodiment, the modem controller 150 digitally selects to communicatively couple one of the at least two modem connectors 160(1-2) to one of the at least one internal antenna 110 based on a service associated with a first one of the at least two modems 141 and 142. For example, the modem controller 150 digitally selects to communicatively couple the first modem 141 in the first modem connector 160-1 to the internal antenna 110 based on a first service associated with the first modem 141. In this manner, the data is sent between the first modem 141 and the internal antenna 110.

In another implementation of this embodiment, the modem controller 150 digitally selects to communicatively couple the first modem 141 in the first modem connector 160-1 to the integrated-wireless-module I/O connector 120 based on the first service associated with the first modem 141. In this manner, the data is sent between the first modem 141 and at least one external antenna 80 (shown in FIG. 2 as a single antenna 80) that is communicatively coupled to the integrated-wireless-module I/O connector 120.

In yet another implementation of this embodiment, the modem controller 150 digitally selects to communicatively couple the first modem connector 160-1 to one of the at least one internal antenna 110 based on a first service associated with the first modem 141 and, simultaneously, the modem controller 150 digitally selects to communicatively couple the second connector 160-2 to the integrated-wireless-module I/O connector 120 based on a second service associated with the second modem 142 positioned in the second modem 142 connector 160-2. In this manner, the data is sent between the first modem 141 and one of the at least one internal antenna 110 at the same time that data is sent between the first modem 141 and one of the at least one external antenna 80 (via the integrated-wireless-module I/O connector 120) and the integrated wireless module 105 simultaneously transmits over two radios 141 and 142 using the two respective antennas 110 and 80.

Modem controller 150 functions with software programs, firmware or other computer readable instructions for carrying out various methods, process tasks, calculations, and control functions, used in the subassembly 85. In one implementation of this embodiment, information about the various possible modems that can be inserted into the at least two modem connectors 160(1-3) and the information about the various services that can be communicatively coupled to the various possible modems is stored in the memory 151. The modem controller 150 uses the information stored in the memory 151 to determine which modem to digitally select.

These instructions implemented by the modem controller 150 are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 3:
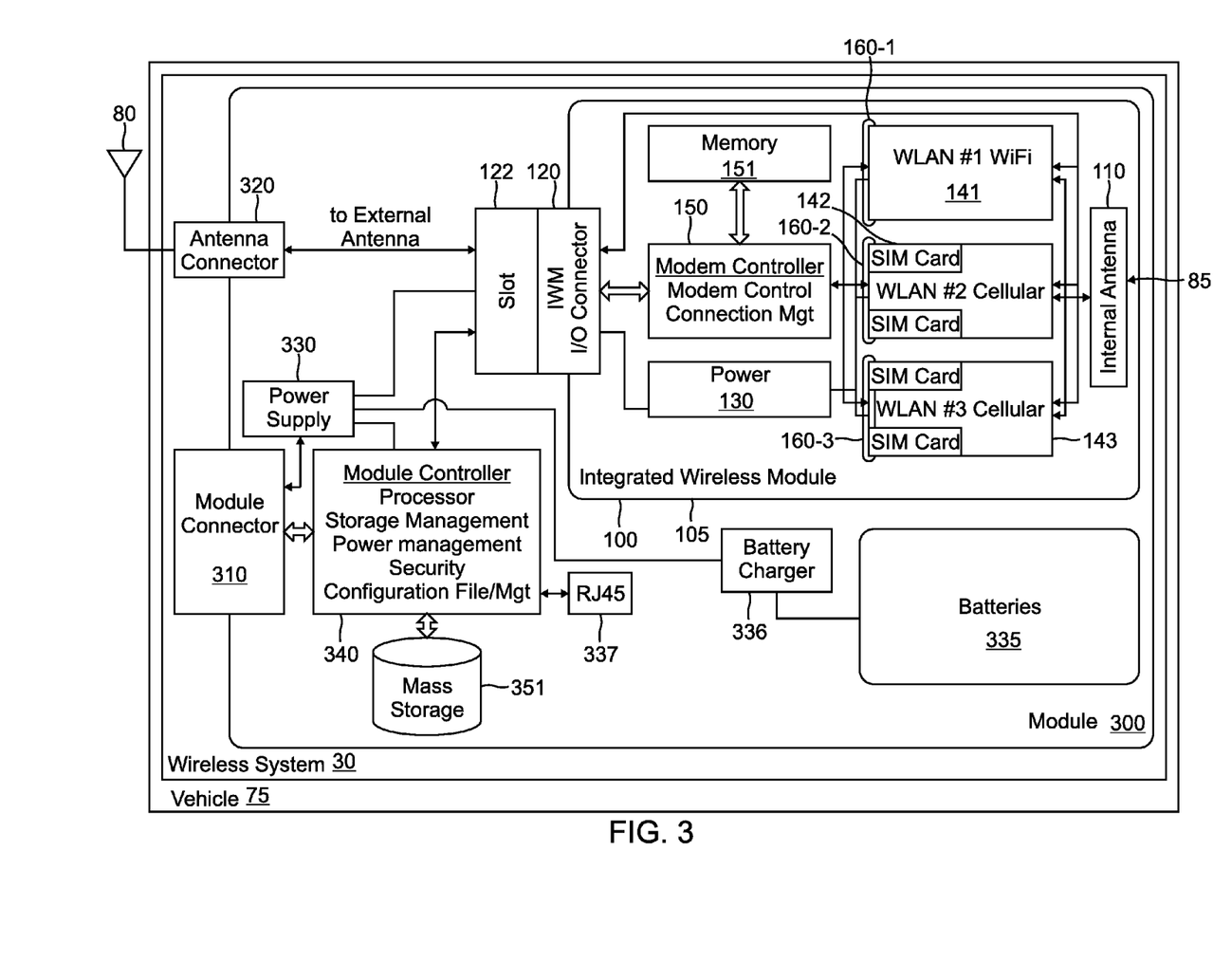
FIG. 3 is an embodiment of a module including an integrated wireless module.

FIG. 3 is an embodiment of a module 300 including an integrated wireless module 105. The integrated wireless module 105 includes a subassembly tray 100 that supports a subassembly 85. The embodiment of the subassembly 85 shown in FIG. 3 includes three modem connectors 160(1-3) that interface three respective modems 141, 142, and 143 to the modem controller 150. The three modems 141, 142, and 143 are communicatively coupled to the integrated-wireless-module I/O connector 120 and to the at least one internal antenna 110. The three modems 141, 142, and 143 are referred to herein as first modem 141, second modem 142, and third modem 143. The exemplary first modem 141 shown in FIG. 3 is a wireless local area network (WLAN) WiFi modem 141. The exemplary second modem 142 shown in FIG. 3 is a WLAN cellular modem 142 with two subscriber identification module (SIM) cards. The exemplary second modem 143 shown in FIG. 3 is a WLAN cellular modem 143 with two SIM cards.

As shown in FIG. 3, the integrated-wireless-module I/O connector 120 of the subassembly 85 on the subassembly tray 100 is configured to interface with a module 300 in a wireless system 30 via a slot 122 in the module 300. The slot 122 is communicatively coupled to at least one external antenna 80 via the external antenna connector 320 of the module 300. In this manner, at least one of the three modems 141, 142, and 143 can be communicatively coupled to the external antenna 80.

The slot 122 is also communicatively coupled to a controller 340 in the module 300. The controller 340 is a processor configured to: control the flow of data stored in a mass storage unit 351; mange power provided to the integrated wireless module 105; manage security; and manage the configuration file. The controller 340 is communicatively coupled to the power supply 330 on the module 300 and to a module connector 310. The module connector 310 communicatively couples the controller 340 to the wireless system 30 on the vehicle 75. The controller 340 is also communicatively coupled to an RJ45 connector (or other types of interfaces).

The slot 122 is also communicatively coupled to the power supply 330. The power supply 330 provides power to the power source 130 in the integrated wireless module 105. The power supply 330 is communicatively coupled to the module connector 310. The power supply 330 also provides power to a battery charger 336. The battery charger 336 charges the batteries 335 on the module 300. The batteries 335 provide power to the power supply 330 when the module 300 is disconnected from the wireless system 30.

The module 300 and the wireless system 30 are located in a vehicle 75. In some embodiments, the vehicle is a land vehicle, a water vehicle, or an air vehicle. In one implementation of this embodiment, the module 300 is a wireless server unit 300 and the wireless system 30 is an avionics system located in an aircraft 75. In one implementation of this embodiment, when the aircraft 75 is parked, the modem controller 150 activates a selected one of the at least one WiFi modem 141, and when the aircraft 75 is moving, the modem controller 150 activates a selected one of the at least one cellular modem 142 or 143. In another implementation of this embodiment, modem controller 150 activates a selected one of the at least one cellular modem 142 or 143 when the aircraft is parked. In yet another implementation of this embodiment, the external antenna 80 is external to the integrated wireless module 105 and is internal to a vehicle 75.

In the embodiment shown in FIG. 3, the modem controller 150 digitally selects to communicatively couple one of the modem connectors 160(1-3) to the internal antenna 110 based on a service associated with the respective modem 141, 142, or 143. In one implementation of this embodiment, there is no subassembly tray 100 and the subassembly 85 is on a board as shown in FIG. 1A.

Figure 4A:
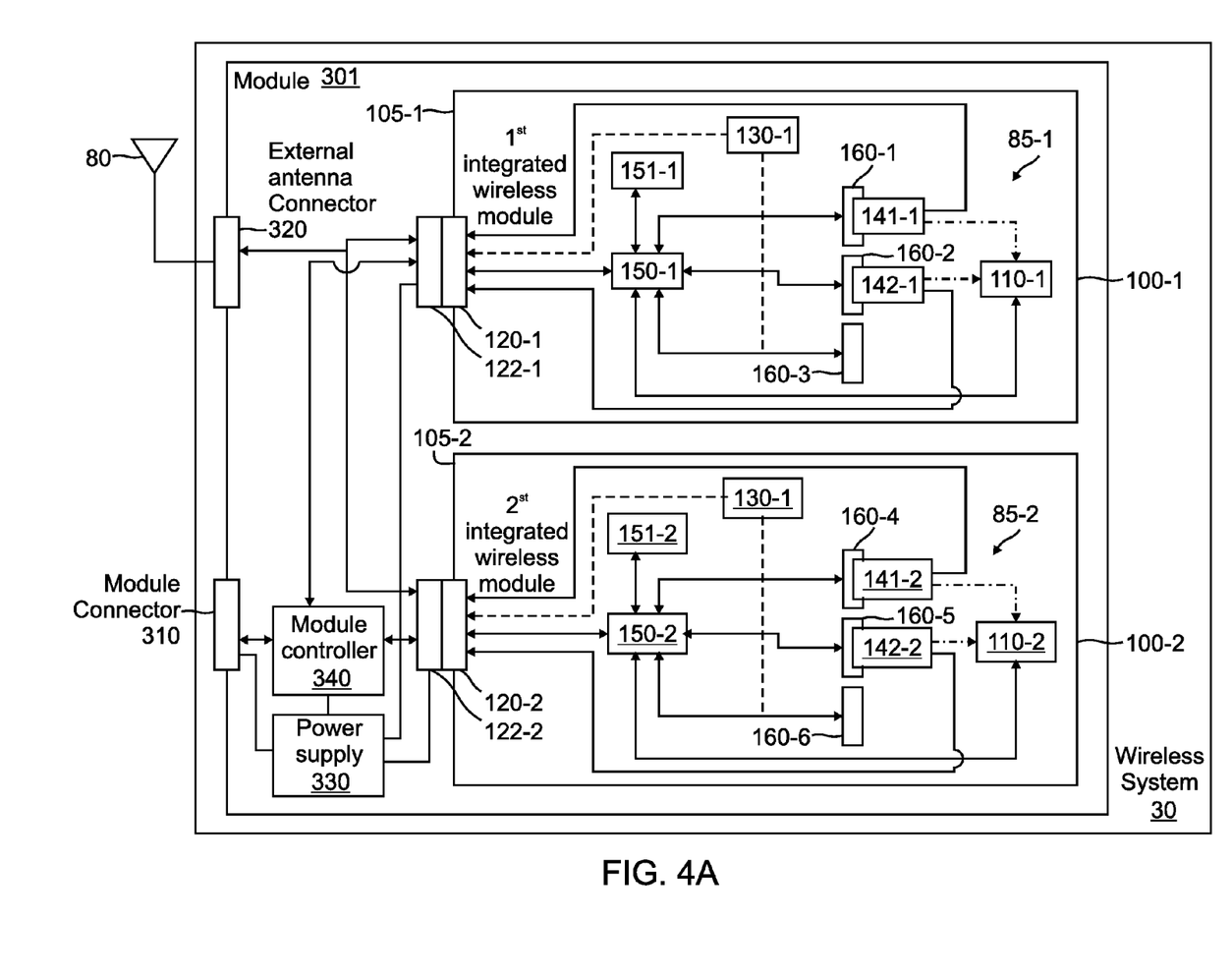
FIG. 4A is an embodiment of a module including a plurality of integrated wireless modules in accordance with the present application.

FIG. 4A is an embodiment of a module 301 including a plurality of integrated wireless modules 105(1-2) in accordance with the present application. The module 301 is configured to accept at least two subassembly trays 100-1 and 110-2 that support two respective subassemblies 85(1-2) in at least two respective integrated wireless modules 105(1-2). A first integrated wireless module 105-1 is similar in structure and function to the integrated wireless module 105 of FIG. 2. Likewise, a second integrated wireless module 105-2 is similar in structure and function to the integrated wireless module 105 of FIG. 2. The first integrated wireless module 105-1 includes a first integrated-wireless-module I/O connector 120-1 that mates with a first slot 122-1 in the module 301. The second integrated wireless module 105-2 includes a second integrated-wireless-module I/O connector 120-2 that mates with a second slot 122-2 in the module 301. The first slot 122-1 and the second slot 122-2 are both communicatively coupled to the controller 340 on the module 301.

The first slot 122-1 and the second slot 122-2 are both communicatively coupled to the external antenna connector 320. The module 301 is able to simultaneously send and receive data from the first internal antenna 110-1 and the second antenna 110-2. In one implementation of this embodiment, the module 301 is able to simultaneously send and receive data from two internal antennas 110-1 on the first integrated wireless module 105-1 and two second antennas 110-2 on the second integrated wireless module 105-2.

At least one of the at least two modems 141-1 and 142-1 positioned on the first-subassembly tray 100-1 is communicatively coupled to the first internal antenna 110-1. The first internal antenna 110-1 is configured to transmit at a first frequency. At least one of the two modems 141-2 and 142-2 positioned on the second-subassembly tray 100-2 is communicatively coupled to a second internal antenna 110-2. The second internal antenna 110-2 is configured to transmit at a second frequency. The first frequency and the second frequency are selected to avoid interference with each other. In this manner, the module 301 is able to transmit simultaneously from two internal antennas 110-1 and 110-2. In one implementation of this embodiment, the module 301 simultaneously transmits from two internal antennas 110-1 and 110-2 and from the external antenna 80. In yet another implementation of this embodiment, the module 301 is communicatively coupled to two external antennas 80. In this case, the module 301 can simultaneously transmits from two internal antennas 110-1 and 110-2 and from two external antennas 80.

In one implementation of this embodiment, there are no subassembly trays 100(1-2) and the subassemblies 85(1-2) are on boards as shown in FIG. 1A.

Figure 4B:
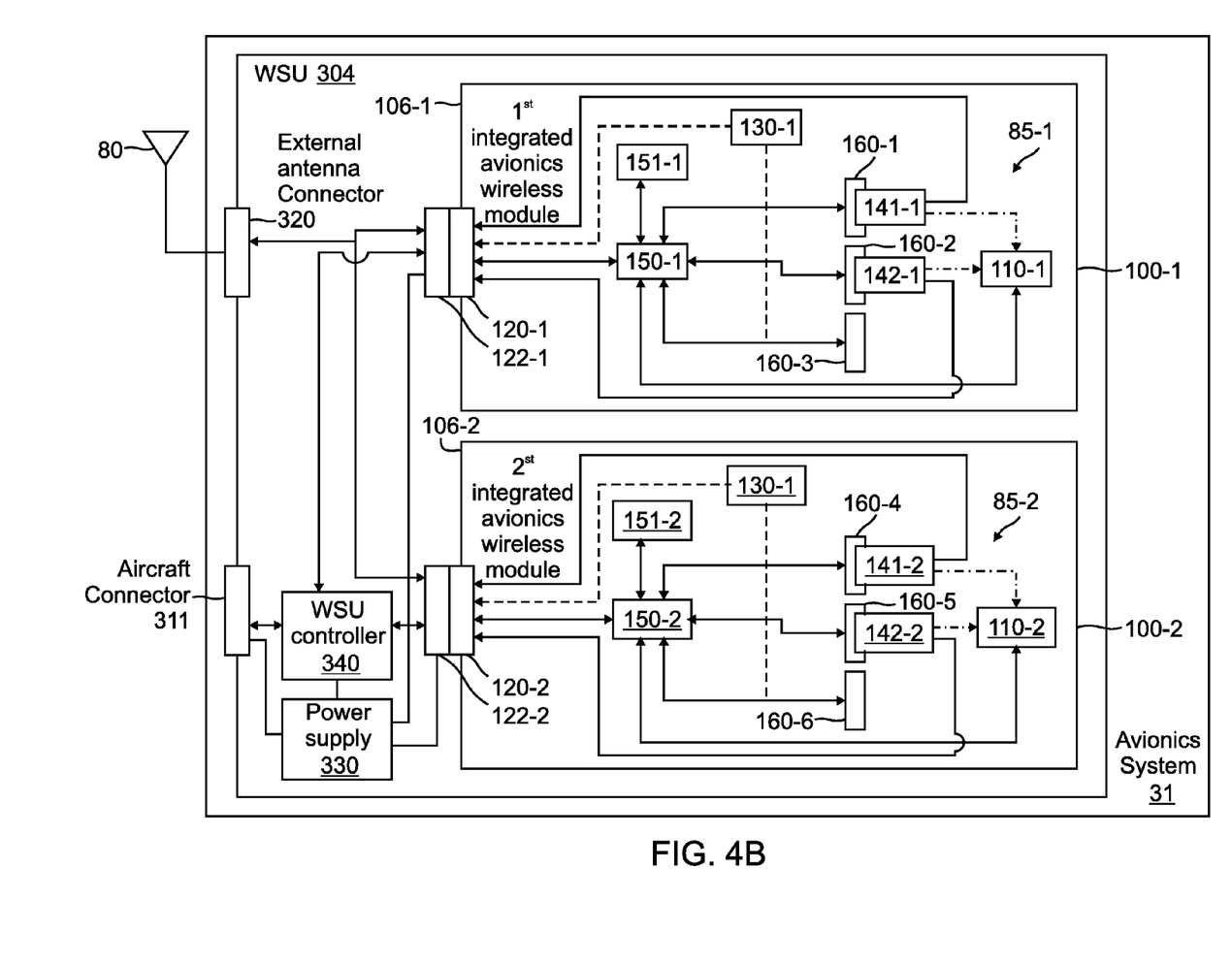
FIG. 4B is an embodiment of a wireless server unit including a plurality of integrated avionics wireless modules in accordance with the present application

An embodiment in which the wireless system 30 is an avionics system is now described. FIG. 4B is an embodiment of a wireless server unit 304 including a plurality of integrated avionics wireless modules 106(1-2) in accordance with the present application. In this embodiment, the wireless system 30 of FIG. 4A is an avionics system 31. The wireless server unit 304 is communicatively coupled to the avionics system 31 via the aircraft connector 311.

The wireless server unit 304 is configured to accept at least two subassembly trays 100-1 and 110-2 that support two respective subassemblies 85(1-2) in at least two respective integrated avionics wireless modules 106(1-2). In one implementation of this embodiment, there are no subassembly trays 100-1 and 110-2 and the subassemblies 85(1-2) are on boards as shown in FIG. 1A.

The first integrated avionics wireless module 106-1 is similar in structure and function to the integrated wireless module 105 of FIG. 2. Likewise, the second integrated avionics wireless module 106-2 is similar in structure and function to the integrated wireless module 105 of FIG. 2. The first integrated avionics wireless module 106-1 includes a first integrated-wireless-module I/O connector 120-1 that mates with a first wireless-server-unit slot 122-1 in the wireless server unit 304. The second integrated avionics wireless module 106-2 includes a second integrated-wireless-module I/O connector 120-2 that mates with a second wireless-server-unit slot 122-2 in the wireless server unit 304. The first wireless-server-unit slot 122-1 and the second wireless-server-unit slot 122-2 are both communicatively coupled to the wireless server unit (WSU) controller 340 on the wireless server unit 304.

The first wireless-server-unit slot 122-1 and the second wireless-server-unit slot 122-2 are both communicatively coupled to the external antenna connector 320. The wireless server unit 304 is able to simultaneously send and receive data from the first internal antenna 110-1 and the second antenna 110-2. In one implementation of this embodiment, the wireless server unit 304 is able to simultaneously send and receive data from two internal antennas 110-1 on the first integrated avionics wireless module 106-1 and two second antennas 110-2 on the second integrated avionics wireless module 106-2. In another implementation of this embodiment, at least one of the at least two modems 141-1 and 142-1 positioned on the first-subassembly tray 100-1 is communicatively coupled to the first internal antenna 110-1.

The first internal antenna 110-1 is configured to transmit at a first frequency. In another implementation of this embodiment, at least one of the two modems 141-2 and 142-2 positioned on the second-subassembly tray 100-2 is communicatively coupled to a second internal antenna 110-2. The second internal antenna 110-2 is configured to transmit at a second frequency. In this manner, the wireless server unit 304 is able to transmit simultaneously from two internal antennas 110-1 and 110-2. In one implementation of this embodiment, the wireless server unit 304 simultaneously transmits from two internal antennas 110-1 and 110-2 and from the external antenna 80. In yet another implementation of this embodiment, the wireless server unit 304 is communicatively coupled to two external antennas 80 (only one of which is shown). In this case, the wireless server unit 304 can simultaneously transmits from two internal antennas 110-1 and 110-2 and from two external antennas 80. In yet another implementation of this embodiment, the wireless server unit 304 includes a single integrated avionics wireless module 106-1.

Figure 5:
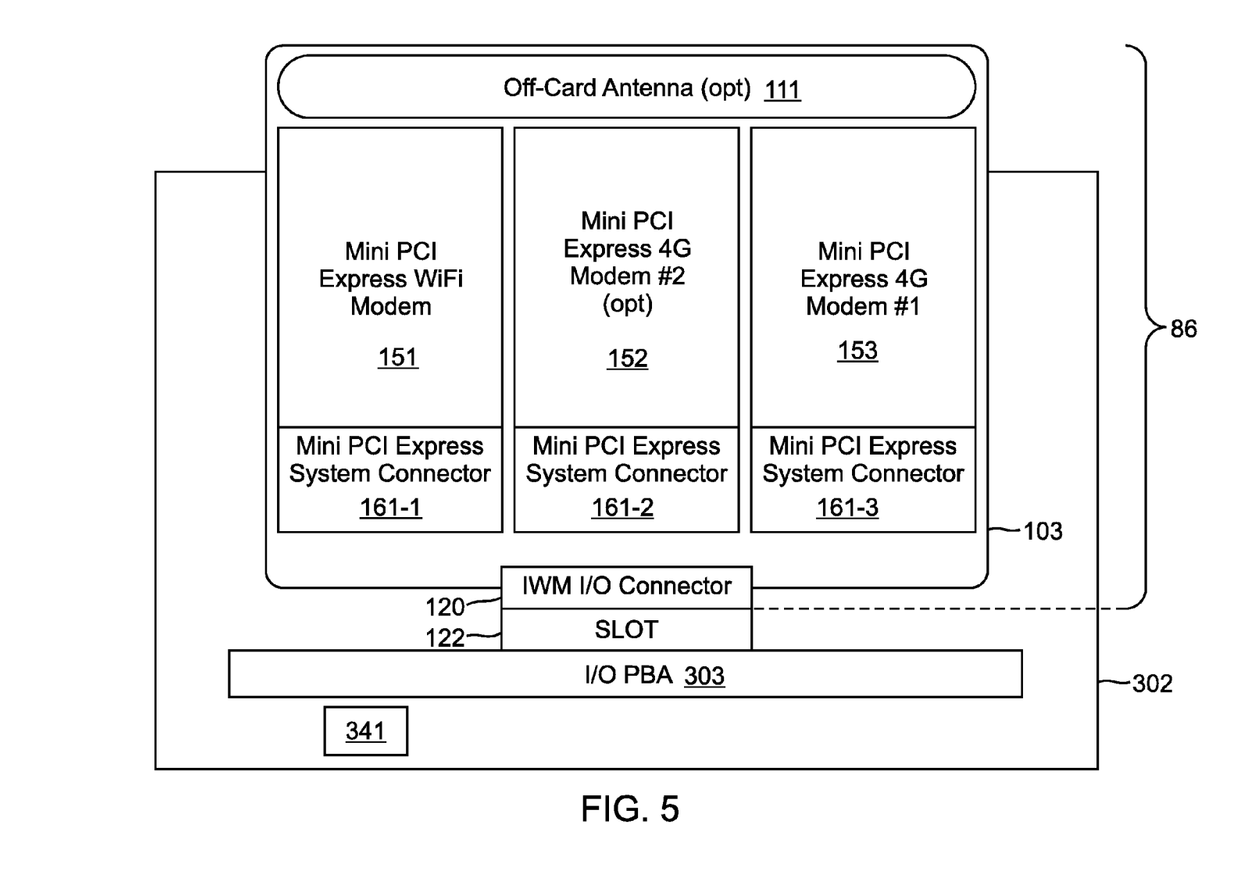
FIG. 5 is an embodiment of a subassembly communicatively coupled to a module in accordance with the present application.

FIG. 5 is an embodiment of a subassembly 86 communicatively coupled to a module 302 in accordance with the present application. As shown in FIG. 5, a subassembly tray 103 of supports the subassembly 86. In another implementation of this embodiment, the subassembly 86 is on a PCB with an edge connector 120.

The module 302 includes an I/O printed board assembly (PBA) 303 with a slot 122. The slot 122 is communicatively coupled to (mates with) an integrated-wireless-module (IWM) I/O connector 120 on the subassembly tray 103. The subassembly 86 on subassembly tray 103 of FIG. 5 includes at least one optional off-card antenna 111 that is configured to communicatively couple to an off-card antenna. An off-card antenna is not on the module 302 but is in or on the vehicle (e.g., vehicle 75 in FIG. 3). The off-card antenna is wirelessly coupled to the modems 151, 152, and 153 via the off-card antenna 111. This configuration is different from the connection to the internal antenna 110 and 110(1-2) as shown in respective FIGS. 2 and 4B.

The modems 151, 152, and 153 shown in FIG. 5 are peripheral component interconnect (PCI) express-type cards 151, 152, and 153 that are supported by a processor 341 on the integrated wireless module 302. The processor 341 is similar in structure and function to the controller 340 shown in FIG. 3. The processor 341 supports the various hardware drivers required for the PCI express-type cards 151, 152, and 153 without requiring an additional host computer for driver software in the avionics. The PCI express-type cards 151, 152, and 153 have a standard form factor defined by specifications known to one skilled in the art. The modem connectors 161 (1-3) also have a standard form factor appropriate to mate with the PCI express-type cards 151, 152, and 153 as known to one skilled in the art.

Other possible types of modems having other form factors can be implemented on the subassembly supported on a subassembly tray of FIGS. 1, 2, and 3 as is understandable to one skilled in the art.

Figure 6:
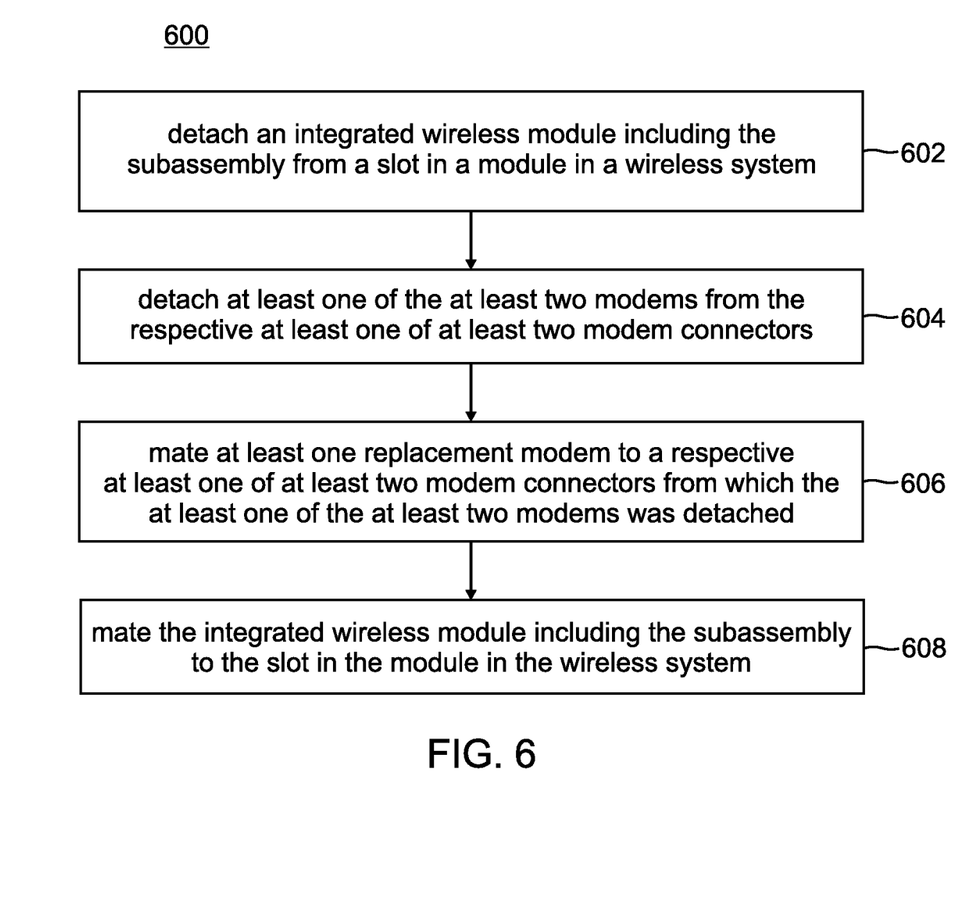
FIG. 6 is a flow diagram of a method of upgrading a subassembly in an integrated wireless module in accordance with the present application.

FIG. 6 is a flow diagram of a method 600 of upgrading a subassembly in an integrated wireless module in accordance with the present application. The method 600 provides details of the method for upgrading the subassembly on an integrated wireless module in a vehicle 75 (FIG. 3) with ease. The upgrades can be done on an integrated wireless module without the need to replace or reconfigure the integrated wireless module. The subassembly (or the subassembly tray) is pulled out of the slot on the module and one or more modems on the subassembly are changed or removed as required for the vehicle. A technician or a mechanic or other user can make the exchange in the field. The method 600 is described with reference to FIGS. 3 and 4B, but the method 600 is applicable to the other embodiments described herein as is understandable to one skilled in the art.

At block 602, an integrated wireless module 105 including the subassembly 85 is detached from a slot 122 in a module 300 in a wireless system 300. At least two modems 141, 142, and/or 143 are attached to respective at least two modem connectors 160-1, 160-2, and/or 160-3 on the subassembly 85.

In one implementation of this embodiment, the subassembly 85 is on a subassembly tray 100. In another implementation of this embodiment, at least two modems 141 and 142 are attached to respective at least two modem connectors 160(1-2) of the subassembly 85 on the subassembly tray 100. In yet another implementation of this embodiment, the subassembly 85 is a PCB with an integrated-wireless-module I/O connector 120 is detached from a respective at least one slot 122 in a module 300 in a wireless system 30. In yet another implementation of this embodiment, an integrated avionics wireless module 106-1 including the subassembly 85-1 is detached from a respective at least one slot 122 in a wireless server unit 304 in an avionics system 31 (FIG. 4B).

At block 604, at least one of the at least two modems 141 and 142 (or modems 141(1-2) and 142(1-2) in FIG. 4B) is detached from the respective at least one of at least two modem connectors 160(1-2) (or modem connectors 160(1-4) in FIG. 4B).

At block 606, a respective at least one replacement modem 141 or 142 (or modems 141(1-2) and 142(1-2) in FIG. 4B) is mated to the at least one of at least two modem connectors 160(1-2) (or modem connectors 160(1-4) in FIG. 4B) from which the at least one of the at least two modems 141 and 142 was detached.

At block 608, the integrated wireless module 105 including the subassembly 85, which may be on a subassembly tray 100, is mated to the slot 122 in the module 300 in the wireless system 30. The at least two modems 141 and 142 attached to the respective at least two modem-connectors on the subassembly 85 include the replacement modem (e.g., modem 141 and/or modem 142) that was mated to the at least one of at least two modem connectors (e.g., modem connector 160-1 and/or modem connector 160-2, respectively) during block 606. In one implementation of this embodiment, the subassembly 85 is a PCB with an integrated-wireless-module I/O connector 120 and the subassembly 85 is mated to a respective at least one slot 122(1-2) in the wireless server unit the wireless system 30 (FIG. 4A).

In another implementation of this embodiment, the integrated avionics wireless module 106-1 including the subassembly 85-1 with the replacement modem (e.g., modem 141 and/or modem 142) is mated to the slot 122-1 in the wireless server unit 304 in the avionics system 31 (FIG. 4B). Method 600 is also applicable to a wireless server unit 304 with a single integrated avionics wireless module.

EXAMPLE EMBODIMENTS

Example 1 includes a subassembly for an integrated wireless module, the subassembly comprising: an integrated-wireless-module input/output (I/O) connector; a modem controller; at least one internal antenna; and at least two modem connectors communicatively coupled to the modem controller, the modem connectors configured to interface with at least two modems, wherein the modem controller digitally selects to one of: communicatively couple one of the at least two modem connectors to one of the at least one internal antenna; communicatively couple one of the at least two modem connectors to the integrated-wireless-module I/O connector; and communicatively couple a first one of the at least two modem connectors to one of the at least one internal antenna and communicatively couple a second one of the at least two modem connectors to the integrated-wireless-module I/O connector.

Example 2 includes the subassembly of Example 1, wherein the integrated wireless module is an integrated avionics wireless module, the subassembly further comprising at least one external antenna, wherein the at least one internal antenna is internal to an aircraft and wherein the at least one external antenna is external to the aircraft.

Example 3 includes the subassembly of any of Examples 1-2, further comprising at least two modems communicatively coupled to a respective at least two of the at least two modem connectors.

Example 4 includes the subassembly of Example 3, wherein modem controller digitally selects to communicatively couple one of the at least two modem connectors to one of the at least one internal antenna based on a service associated with a first one of the at least two modems.

Example 5 includes the subassembly of any of Examples 3-4, wherein modem controller digitally selects to communicatively couple one of the at least two modem connectors to the integrated-wireless-module I/O connector based on a service associated with a first one of the at least two modems.

Example 6 includes the subassembly of any of Examples 3-5, wherein the at least two modem connectors include at least a first modem connector and a second modem connector, and wherein modem controller digitally selects to: communicatively couple the first modem connector to one of the at least one internal antenna based on a first service associated with a first modem positioned in the first modem connector; and communicatively couple the second modem connector to the integrated-wireless-module I/O connector based on a second service associated with a second modem positioned in the second modem connector.

Example 7 includes the subassembly of any of Examples 3-6, wherein at least one of the at least two modems is communicatively coupled to at least one off-card antenna.

Example 8 includes the subassembly of any of Examples 1-7, wherein the integrated-wireless-module I/O connector is configured to connect to a slot in a module, the slot being communicatively coupled to at least one external antenna.

Example 9 includes an integrated wireless module, comprising: at least one integrated-wireless-module input/output (I/O) connector; at least one internal antenna; at least two modems; and a modem controller communicatively coupled to the at least two modems, wherein the modem controller digitally selects to one of: communicatively couple one of the at least two modems to one of the at least one internal antenna; communicatively couple one of the at least two modems to one of at least one an external antenna via the integrated-wireless-module I/O connector; and communicatively couple a first one of the at least two modems to one of the at least one internal antenna and communicatively couple a second one of the at least two modems to one of the at least one external antenna via the integrated-wireless-module I/O connector.

Example 10 includes the integrated wireless module of Example 9, further comprising a subassembly tray that includes at least two modem connectors configured to interface the respective at least two modems to the modem controller, and wherein the integrated-wireless-module I/O connector is attached to the subassembly tray and is configured to interface with a module in a wireless system, wherein the at least one internal antenna is operably positioned on the subassembly tray.

Example 11 includes the subassembly of any of Examples 9-10, wherein at least one of the at least two modems is communicatively coupled to at least one off-card antenna.

Example 12 includes the integrated wireless module of any of Examples 9-11, wherein the integrated wireless module is an integrated avionics wireless module operably positioned in an aircraft, wherein the at least one internal antenna is internal to the aircraft and wherein the at least one external antenna is external to the aircraft.

Example 13 includes the integrated wireless module of Example 12, wherein the at least two modems include at least one WiFi modem and at least one cellular modem, and wherein, when the aircraft is parked, the modem controller activates a selected one of the at least one WiFi modem, and wherein, when the aircraft is moving, the modem controller activates a selected one of the at least one cellular modem.

Example 14 includes the integrated wireless module of any of Examples 9-13, wherein the at least two modems include at least one WiFi modem and at least one cellular modem.

Example 15 includes the integrated wireless module of any of Examples 9-14, wherein the at least one integrated-wireless-module I/O connector includes a first integrated-wireless-module I/O connector and a second I/O system connector, the module further comprising: a first-subassembly tray including the first integrated-wireless-module I/O interface to mate with a module in a wireless system, wherein at least one of the at least two modems is positioned on the first-subassembly tray; and a second-subassembly tray including the second integrated-wireless-module I/O interface to mate with the module in the wireless system, wherein at least one other of the at least two modems is positioned on the second-subassembly tray.

Example 16 includes the integrated wireless module of Example 15, wherein the at least one of the at least two modems positioned on the first-subassembly tray is communicatively coupled to a first internal antenna configured to transmit at a first frequency, and wherein the at least one other of the at least two modems positioned on the second-subassembly tray is communicatively coupled to a second internal antenna configured to transmit at a second frequency, the first and second frequency selected to avoid interference with each other.

Example 17 includes the integrated wireless module of any of Examples 15-16, wherein the at least two modems include at least one WiFi modem and at least one cellular modem.

Example 18 includes a method of upgrading a subassembly in an integrated wireless module, the method comprising: detaching an integrated wireless module including the subassembly from a slot in a module in a wireless system, wherein at least two modems are attached to respective at least two modem connectors on the subassembly; detaching at least one of the at least two modems from the respective at least one of at least two modem connectors; and mating at least one replacement modem to a respective at least one of at least two modem connectors from which the at least one of the at least two modems was detached.

Example 19 includes the method of Example 18, further comprising: mating the integrated wireless module including the subassembly to the slot in the module in the wireless system, wherein the at least two modems attached to the respective at least two modem-connectors on the subassembly include the replacement modem.

Example 20 includes the method of any of Examples 18-19, wherein detaching the integrated wireless module including the subassembly from the slot in the module in the wireless system comprises: detaching an integrated avionics wireless module including the subassembly from the slot in a wireless server unit in an avionics system, the method further comprising: mating the integrated avionics wireless module including the subassembly to the slot in the wireless server unit in the avionics system responsive to detaching at least one of the at least two modems from the respective at least one of at least two modem connectors and mating at least one replacement modem to a respective at least one of at least two modem connectors from which the at least one of the at least two modems was detached.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A subassembly for an integrated wireless module, the subassembly comprising:
   an integrated-wireless-module input/output (I/O) connector mounted on a subassembly tray;
   a modem controller mounted on the subassembly tray;
   at least one internal antenna of the integrated wireless module mounted on the subassembly tray; and
   at least two modem connectors communicatively coupled to the modem controller, the modem connectors mounted on the subassembly tray and configured to interface with at least two modems, wherein the modem controller digitally selects at least one of:
   communicatively couple at least one of the at least two modem connectors to one of the at least one internal antenna to send and receive data from the at least one internal antenna;
   communicatively couple at least one of the at least two modem connectors to the integrated-wireless-module I/O connector to send and receive data via the integrated-wireless-module I/O connector; and
   communicatively couple a first one of the at least two modem connectors to one of the at least one internal antenna to send and receive data from the at least one internal antenna and communicatively couple a second one of the at least two modem connectors to the integrated-wireless-module I/O connector to send and receive data via the integrated-wireless-module I/O connector.

2. The subassembly of claim 1, wherein the subassembly for the integrated wireless module is a subassembly for an integrated avionics wireless module, the subassembly further comprising at least one external antenna, wherein the at least one internal antenna is internal to an aircraft and wherein the at least one external antenna is external to the aircraft.

3. The subassembly of claim 1, further comprising at least two modems communicatively coupled to a respective at least two of the at least two modem connectors.

4. The subassembly of claim 3, wherein the modem controller digitally selects to communicatively couple one of the at least two modem connectors to one of the at least one internal antenna based on a service associated with a first one of the at least two modems.

5. The subassembly of claim 3, wherein the modem controller digitally selects to communicatively couple one of the at least two modem connectors to the integrated-wireless-module I/O connector based on a service associated with a first one of the at least two modems.

6. The subassembly of claim 3, wherein the at least two modem connectors include at least a first modem connector and a second modem connector, and wherein the modem controller digitally selects to:
   communicatively couple the first modem connector to one of the at least one internal antenna based on a first service associated with a first modem positioned in the first modem connector; and
   communicatively couple the second modem connector to the integrated-wireless-module I/O connector based on a second service associated with a second modem positioned in the second modem connector.

7. The subassembly of claim 3, wherein at least one of the at least two modems is communicatively coupled to at least one off-card antenna.

8. The subassembly of claim 1, wherein the integrated-wireless-module I/O connector is configured to connect to a slot in a module, the slot being communicatively coupled to at least one external antenna.

9. An integrated wireless module, comprising:
a subassembly tray;
at least one integrated-wireless-module input/output (I/O) connector mounted on the subassembly tray;
at least one internal antenna of the integrated wireless module mounted on the subassembly tray;
at least two modems; and
a modem controller mounted on the subassembly tray communicatively coupled to the at least two modems, wherein the modem controller digitally selects to at least one of:
communicatively couple at least one of the at least two modems to one of the at least one internal antenna to send and receive data from the at least one internal antenna;
communicatively couple at least one of the at least two modems to one of at least one external antenna via the integrated-wireless-module I/O connector to send and receive data via the integrated-wireless-module I/O connector; and
communicatively couple a first one of the at least two modems to one of the at least one internal antenna to send and receive data from the at least one internal antenna and communicatively couple a second one of the at least two modems to one of the at least one external antenna via the integrated-wireless-module I/O connector to send and receive data via the integrated-wireless-module I/O connector.

10. The integrated wireless module of claim 9, further comprising at least two modem connectors mounted on the subassembly tray and configured to interface the respective at least two modems to the modem controller, and wherein the integrated-wireless-module I/O connector is attached to the subassembly tray and is configured to interface with a module in a wireless system, wherein the at least one internal antenna is operably positioned on the subassembly tray.

11. The integrated wireless module of claim 9, wherein at least one of the at least two modems is communicatively coupled to at least one off-card antenna.

12. The integrated wireless module of claim 9, wherein the integrated wireless module is an integrated avionics wireless module operably positioned in an aircraft, wherein the at least one internal antenna is internal to the aircraft and wherein the at least one external antenna is external to the aircraft.

13. The integrated wireless module of claim 12, wherein the at least two modems include at least one WiFi modem and at least one cellular modem, and wherein, when the aircraft is parked, the modem controller activates a selected one of the at least one WiFi modem, and wherein, when the aircraft is moving, the modem controller activates a selected one of the at least one cellular modem.

14. The integrated wireless module of claim 9, wherein the at least two modems include at least one WiFi modem and at least one cellular modem.

15. The integrated wireless module of claim 9, wherein the at least one integrated-wireless-module I/O connector includes a first integrated-wireless-module I/O connector and a second I/O system connector, the module further comprising:

a first-subassembly tray including the first integrated-wireless-module I/O interface to mate with a module in a wireless system, wherein at least one of the at least two modems is positioned on the first-subassembly tray; and
a second-subassembly tray including the second integrated-wireless-module I/O interface to mate with the module in the wireless system, wherein at least one other of the at least two modems is positioned on the second-subassembly tray.

16. The integrated wireless module of claim 15, wherein the at least one of the at least two modems positioned on the first-subassembly tray is communicatively coupled to a first internal antenna configured to transmit at a first frequency, and
wherein the at least one other of the at least two modems positioned on the second-subassembly tray is communicatively coupled to a second internal antenna configured to transmit at a second frequency, the first and second frequency selected to avoid interference with each other.

17. The integrated wireless module of claim 15, wherein the at least two modems include at least one WiFi modem and at least one cellular modem.

18. A method of upgrading a subassembly mounted on a subassembly tray in an integrated wireless module, the method comprising:
detaching an integrated wireless module including the subassembly from a slot in a module in a wireless system, wherein at least two modems are attached to respective at least two modem connectors mounted on the subassembly tray on the subassembly, and wherein at least one internal antenna of the integrated wireless module is mounted on the subassembly tray;
detaching at least one of the at least two modems from the respective at least one of at least two modem connectors;
mating at least one replacement modem to a respective at least one of at least two modem connectors from which the at least one of the at least two modems was detached; and
mating the integrated wireless module including the subassembly to the slot in the module in the wireless system, wherein the at least two modems attached to the respective at least two modem-connectors on the subassembly include the replacement modem.

19. The method of claim 18, wherein detaching the integrated wireless module including the subassembly from the slot in the module in the wireless system comprises:
detaching an integrated avionics wireless module including the subassembly from the slot in a wireless server unit in an avionics system, the method further comprising:
mating the integrated avionics wireless module including the subassembly to the slot in the wireless server unit in the avionics system responsive to detaching at least one of the at least two modems from the respective at least one of at least two modem connectors and mating at least one replacement modem to a respective at least one of at least two modem connectors from which the at least one of the at least two modems was detached.

* * * * *